US011249639B2

(12) United States Patent
Turk

(10) Patent No.: US 11,249,639 B2
(45) Date of Patent: Feb. 15, 2022

(54) SYSTEM FOR A BACK-UP CAMERA OF A VEHICLE

(71) Applicant: DENSO International America, Inc., Southfield, MI (US)

(72) Inventor: Jeffrey Turk, South Lyon, MI (US)

(73) Assignee: DENSO International America, Inc., Southfield, MI (US)

(*) Notice: Subject to any disclaimer, the term of this patent is extended or adjusted under 35 U.S.C. 154(b) by 0 days.

(21) Appl. No.: 16/695,329

(22) Filed: Nov. 26, 2019

(65) Prior Publication Data

US 2021/0157465 A1 May 27, 2021

(51) Int. Cl.
| | |
|---|---|
| *G06F 3/0488* | (2013.01) |
| *G06F 3/041* | (2006.01) |
| *G06F 3/01* | (2006.01) |
| *B60R 1/00* | (2006.01) |
| *B60D 1/36* | (2006.01) |

(52) U.S. Cl.
CPC ............ *G06F 3/0488* (2013.01); *B60D 1/36* (2013.01); *B60R 1/00* (2013.01); *G06F 3/017* (2013.01); *G06F 3/0416* (2013.01); *B60K 2370/1438* (2019.05); *G06F 2203/04808* (2013.01)

(58) Field of Classification Search
CPC combination set(s) only.
See application file for complete search history.

(56) References Cited

U.S. PATENT DOCUMENTS

| 8,138,899 | B2 | 3/2012 | Ghneim | |
|---|---|---|---|---|
| 9,164,955 | B2 | 10/2015 | Lavoie et al. | |
| 2014/0358424 | A1* | 12/2014 | Lavoie | B60D 1/62 701/428 |
| 2018/0164817 | A1* | 6/2018 | Herz | G05D 1/0212 |
| 2018/0286240 | A1* | 10/2018 | Harai | B60W 30/06 |
| 2021/0163068 | A1* | 6/2021 | Zhu | G05D 1/021 |

FOREIGN PATENT DOCUMENTS

CN 109491389 A 3/2019

* cited by examiner

*Primary Examiner* — Robin J Mishler
(74) *Attorney, Agent, or Firm* — Dickinson Wright PLLC

(57) ABSTRACT

A vehicle system may include a camera configured to output imagery of a surrounding of a vehicle. The vehicle system may also include a touch panel screen configured to display the imagery and receive one or more inputs from a finger of a user when the imagery is displayed on the touch panel screen. The vehicle system may further include a processor in communication with the camera and touch panel screen, wherein the processor is programmed to associate a path for the vehicle to drive in response to the one or more inputs from the finger and execute one or more driving commands to operate the vehicle along the path in reverse.

12 Claims, 7 Drawing Sheets

SYSTEM FOR A BACK-UP CAMERA OF A VEHICLE

TECHNICAL FIELD

The present disclosure relates to a back-up system in a vehicle.

BACKGROUND

Vehicles may include a back-up system to assist a driver to operate the vehicle in reverse, as the driver's field of view may be blocked when operating in reverse. The back-up system may utilize proximity sensors, such as cameras and radar sensors, to identify objects proximate the vehicle. Furthermore, the back-up system may utilize a display screen to assist the driver when operating in reverse.

SUMMARY

According to one embodiment, a vehicle system may include a camera configured to output imagery of a surrounding of a vehicle. The vehicle system may also include a touch panel screen configured to display the imagery and receive one or more inputs from a finger of a user when the imagery is displayed on the touch panel screen. The vehicle system may further include a processor in communication with the camera and the touch panel screen, wherein the processor is programmed to associate a path for the vehicle to drive in response to the one or more inputs from the finger and execute one or more driving commands to operate the vehicle along the path in reverse.

According to a second embodiment, a vehicle system includes a camera configured to output imagery of a surrounding of a vehicle, a screen configured to display the imagery and receive one or more inputs from a user when the imagery is displayed on the screen, and a processor in communication with the camera and the screen. The processor is programmed to associate an object to avoid in response to one or more inputs from the user, determine a path for the vehicle to drive in response to the one or more inputs from the user, and execute one or more driving commands to operate the vehicle along the path in reverse.

According to a third embodiment, a vehicle system includes a camera configured to output imagery of a surrounding of a vehicle and a display screen configured to display the imagery. The vehicle system further includes a processor in communication with the camera and the display screen, wherein the processor is programmed to, when the vehicle is in reverse, associate a path for the vehicle to drive in response to the one or more inputs from spoken dialogue received at a microphone in communication with the processor and execute one or more driving maneuvers to operate the vehicle along the path in reverse.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include a back-up system to assist a driver to operate the vehicle in reverse, as the driver's field of view may be blocked when operating in reverse. The back-up system may utilize proximity sensors, such as cameras and radar sensors, to identify objects proximate the vehicle. Furthermore, the back-up system may utilize a display screen to assist the driver when operating in reverse. The back-up system of the current disclosure may allow the user to interact with the back-up system to identify a path to travel or objects to avoid. Thus, the user may have some interaction with the back-up system while not physically taking complete control of the vehicle. This allows the user to specifically identify objects and obstructions in the vehicle's path without solely relying on vehicle sensors. Such a system may provide a user with extra confidence that vehicle sensors may avoid objects or obstructions in an autonomous or semi-autonomous driving scenario. Thus, rather than solely relying on a computer and sensors to avoid objects or potential collisions, input received by the user may provide some relief to anxiety in autonomous or semi-autonomous driving.

Figure 1:
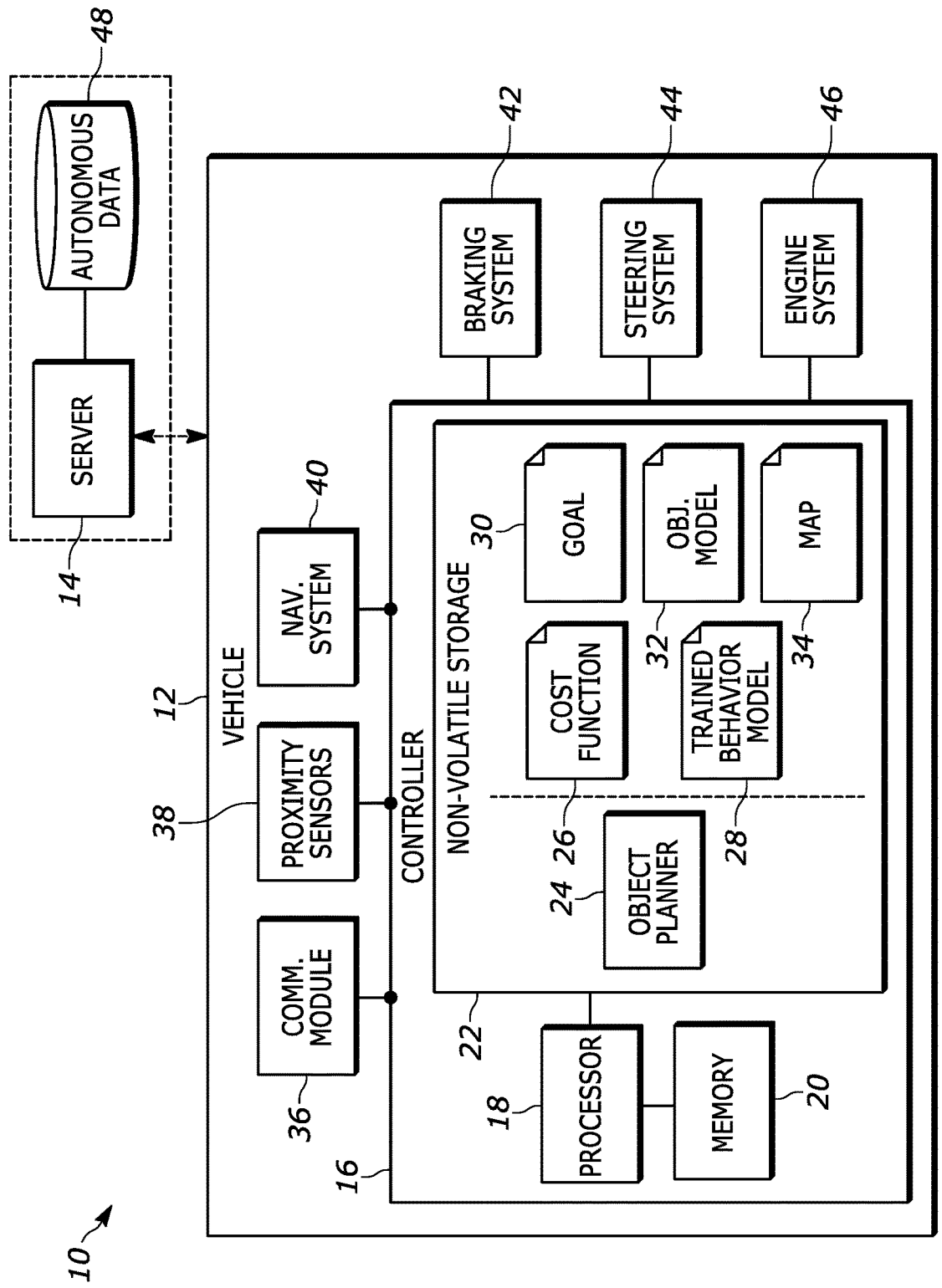
FIG. 1 illustrates a system 10 for implementing an autonomous driving system or semi-autonomous drive system configured to generate a driving plan for a vehicle.

FIG. 1 illustrates a system 10 for implementing an autonomous driving system or semi-autonomous drive system configured to generate a driving plan for a vehicle 12. The vehicle 12 may include any type of vehicle, such as a passenger vehicle, a commercial vehicle, motorcycle, sport utility vehicle, minivan, sedan, watercraft, off-road vehicle, etc. In various implementations, the vehicle 12 may be autonomous, thus the vehicle 12 may be guide itself with little to no human input based on the ability to sense its environment utilizing various sensors, transceivers, systems, and other components of the vehicle. The system 10 may include the vehicle 12 and a remote server 14. The vehicle 12 may wirelessly communicate with the remote server 14 via one or more networks, such as one or more of the Internet, a local area network, a wide area network, and a cellular network.

The vehicle 12 may include a controller 16. The controller 16 may be a vehicle controller, such as an electronic control unit (ECU). The controller 16 may be configured to implement the planning-based approach and/or the learning-based approach described herein. In other words, the controller 16 may be configured to plan the operation of other vehicles traveling proximate the vehicle 12 and to control the vehicle 12 based thereon.

The controller 16 may include a processor 18, memory 20, and non-volatile storage 22. The processor 18 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 20. The memory 20 may include a single memory device or a plurality of memory devices including, but not limited to, random access memory (RAM), volatile memory, non-volatile memory, static random-access memory (SRAM), dynamic random-access memory (DRAM), flash memory, cache memory, or any other device capable of storing information. The non-volatile storage 22 may include one or more persistent data storage devices such as a hard drive, optical drive, tape drive, non-volatile solid-state device, or any other device capable of persistently storing information.

The processor 18 may be configured to read into memory 20 and execute computer-executable instructions embodying one or more software programs, such as an object planner 24, residing in the non-volatile storage 22. The object planner 24 may be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the object planner 24 may be configured, upon execution by the processor 18, to cause the controller 16 to implement the object planner 24, and correspondingly to implement functions, features, and processes of the object planner 24 described herein.

The non-volatile storage 22 may also include data utilized by the controller 16, or more particularly by the object planner 24, when implementing the functions, features, and processes of the controller 16 described herein. For example, the non-volatile storage 22 may include cost function data 26, trained behavior model data 28, goal data 30, object model data 32, and map data 34, each of which may enable the object planner 24 to predict behaviors of other objects proximate the vehicle 12. The cost function data 26 may define one or more cost functions, each which may map a candidate trajectory for a proximate object to a cost value to the object for taking the trajectory. The cost function data 26 may be utilized to mitigate or eliminate any accidents or impact between two possible maneuvers in a driving situation. As such, the cost function data may be utilized to help the vehicle determine an appropriate trajectory to avoid objects when reversing out of a parking spot (or similar scenario) by analyzing and determining the appropriate reverse trajectory. The trained behavior model data 28 may define one or more trained behavior models, each which may be configured to predict the future behavior of a given proximate object based on a data set of previously observed object behaviors and current observations of the proximate object. The goal data 30 may define goals for various objects given a particular travel context (e.g., highway road, city road, object class such as passenger vehicle, motorcycle, semi-truck, bicycle, pedestrian, or non-moving object in the road). The object model data 32 may define one or more object models, which may set forth the dynamics for various object classes. The map data 34 may define travel infrastructure details by location.

The non-volatile storage 22 may also include one or more database structures for collecting, organizing, and enabling fast retrieval of the data stored therein. For example, the stored data may be arranged in one or more relational databases, one or more hierarchical databases, one or more network databases, or combinations thereof. A database management system in the form of computer software executing as instructions on the processor 18 may be used to access the information or data records of the databases in response to a query, which may be dynamically determined and executed by the object planner 24.

The controller 16 may communicate with other components of the vehicle 12, such as a communications module 36, various proximity sensors 38, a navigation system 40, a braking system 42, a steering system 44, and an engine system 46. The controller 16 may be directly connected to one or more of these other components, such as via various input/output (I/O) ports of the controller 16. Additionally or alternatively, the controller 16 may communicate with one or more of these other components over one or more in-vehicle networks, such as a vehicle controller area network (CAN), an Ethernet network, a media oriented system transfer (MOST) network, and a wireless local area network (WLAN).

The communications module 36 may be configured to facilitate wireless communication between the vehicle 12 components and other devices and systems external to the vehicle 12, such as the remote server 14, using radio frequency (RF) transmissions. For example, the communications module 36 may include a cellular modem or other wireless network transceiver (e.g., Wi-Fi transceiver) configured to communicate with the remote server 14 over one or more networks, such as one or more of the Internet, a local area network, a wide area network, and a cellular network to which the cellular modem is subscribed. The controller 16 may communicate with the remote server 14 by accessing the communication capabilities of the communications module 36.

The communications module 36 may also include one or more wireless transceivers configured to facilitate direct wireless communication with other devices and systems, such as a personal computer device or key fob, when such other devices and systems are local to (e.g., within direct wireless communication range of) the vehicle 12. To facilitate such local wireless communications, the communications module 36 may include a Bluetooth transceiver, a ZigBee transceiver, a Wi-Fi transceiver, a radio-frequency identification (RFID) transceiver, a near-field communication (NFC) transceiver, a vehicle-to-vehicle (V2V) transceiver, a vehicle-to-infrastructure (V2I) transceiver, and/or transceivers designed for other RF protocols particular to remote services provided by the vehicle 12 (e.g., keyless entry, remote start, passive entry passive start).

The proximity sensors 38 may be configured to detect objects proximate to the vehicle 12 and to correspondingly generate proximity data indicative of the current operating state of such objects. For example, the proximity sensors 38 may be configured to detect the existence of other vehicles, lane lines, guard rails, objects in the roadway, buildings, and pedestrians within a particular distance of the vehicle 12.

The proximity sensors 38 may be configured to communicate the generated proximity data to the to the controller 16, which may be configured to interpret the proximity data to derive the operating state of each detected proximate object. For example, the controller 16 may be configured to identify a pose for each proximate object, which may indicate the position and orientation of each object relative to the vehicle 12 (e.g., angle and distance). The controller 16 may also be configured to identify movement information for each proximate object (e.g., speed, velocity, acceleration), and a class for each proximate object (e.g., passenger vehicle, truck, motorcycle, pedestrian, bicycle). The controller 16 may then be configured to utilize the operating state of each proximate object to plan an operation for the object, such as slowing down or switching lanes, and to control operation of the vehicle 12 based on the planned operation.

As an example, the proximity sensors 38 may include one or more Light Detection and Ranging (LIDAR) sensors. The LIDAR sensors may each be configured to measure a distance to an object external and proximate to the vehicle 12 by illuminating the target with a pulsed laser light and measuring the reflected pulses with a sensor. The LIDAR sensors may then measure the differences in laser return times and, based on these measured differences and the received wavelengths, may generate a digital 3-D representation of the object. The LIDAR sensors may further have the ability to classify various objects based on the 3-D rendering of the object. For example, by determining a shape of the target, the LIDAR sensors may classify the object as a passenger vehicle, motorcycle, truck, curb, roadblock, building, pedestrian, and so on. The LIDAR sensors may work in conjunction with other vehicle components, such as the controller 16 and other proximity sensors 38, to classify various objects outside of the vehicle 12. The LIDAR sensors may include laser emitters, laser receivers, and any other suitable LIDAR autonomous vehicle sensor components. The LIDAR sensors may further be arranged within a housing configured to rotate to facilitate scanning of the environment.

As another example, the proximity sensors 38 may include one or more cameras for capturing images of the environment surrounding the vehicle 12. For example, the proximity sensors 38 may include a forward-facing camera that is mounted to the rear-view mirror of the vehicle 12 and is configured to collect image data of the environment in front of the vehicle 12. Similarly, the proximity sensors 38 may include a rear-facing camera that is mounted to the trunk of the vehicle 12 and is configured to collect image data of the environment behind the vehicle 12, and may include side-facing cameras that are mounted to the side view mirrors of the vehicle 12 and are configured to collected image data of the environment to each side of the vehicle 12. The controller 16 may be configured to process the image data captured by the one or more cameras of the vehicle 12 to identify conditions around the vehicle 12, including, for example, the position of lane markers, the existence of traffic symbols, and the existence and operating state of other objects proximate the vehicle 12. The controller 16 may be configured to identify such conditions by comparing the location and color of pixels within the image data to prestored templates associated with various conditions.

As additional examples, the proximity sensors 38 may include one or more radar sensors, one or more ultrasonic sensors, and/or any other sensors for detecting information about the surroundings of the vehicle 12. The sensors may be mounted anywhere on the vehicle 12. For example, a proximity sensor 38 may be mounted on a roof of the vehicle 12 so as to have a 360-degree view of the environment surrounding the vehicle 12. Additionally or alternatively, various proximity sensors 38 may surround the vehicle 12 to provide a 360-degree view of the vehicle 12. The vehicle 12 may include actuators for adjusting an angle of the field of view of the various proximity sensors 38.

The navigation system 40 may be configured to generate geographic data for the vehicle 12, such as via communicating with one or more satellites orbiting Earth. The geographic data may indicate a current geographic location of the vehicle 12, such as by including current longitude and latitude coordinates of the vehicle 12. As some non-limiting examples, the navigation system 40 may include one or more of a Global Positioning System (GPS) module, a Quazi-Zenith Satellite System (QZSS) module, a Russian Global Navigation Satellite System (GLONASS) module, a Galileo System (GSNN) module, an Indian Regional Navigation Satellite System (IRNSS) module, and an inertial navigation system (INS) module.

The navigation system 40 may communicate the geographic data to the controller 16, which may be configured to utilize the geographic data to determine the geographic location of the vehicle 12, and to correspondingly determine the geographic location of detected proximate objects. The vehicle 12 may also include a gyroscope or compass configured to indicate a current heading of the vehicle 12, which the controller 16 may combine with the geographic data to produce data indicating the current location and heading of the vehicle 12. Alternatively, the controller 16 may determine the heading of the vehicle 12 based on received geographic data indicating a changed position of the vehicle 12 over a short time span (e.g., one second), which suggests that the vehicle 12 is moving in a direction corresponding to the change in position.

The controller 16 may be configured to query the map data 34 based on the geographic data to identify information about the travel infrastructure currently in use by the vehicle 12. In particular, the map data 34 may include detailed information about travel infrastructure in various geographic locations, such as road type (e.g., highway, city), road properties (e.g., one way, multi-lane, slope information, curvature information), detailed lane information (e.g., location, dimensions, restrictions such as no passing, turn-only, and traffic direction), and the locations and dimensions of curbs, sidewalks, traffic signals, traffic signs, and crosswalks relative to a road, as some non-limiting examples. Alternatively, the controller 16 may be configured to derive at least some of this information from proximity data generated by the proximity sensors 38, such as via processing image data captured by cameras of the vehicle 12.

The controller 16 may be responsive to receiving the geographic data from navigation system 40, the proximity data from the proximity sensors 38, and the map data 34 corresponding to the received geographic data. The controller 16 may identify the position of each detected proximate object within the currently used travel infrastructure, which may also be part of the determined operating state for each object. Specifically, the controller 16 may be configured to determine the location of the vehicle 12 within travel infrastructure based on the geographic data, the map data 34, and/or the received proximity data, including which lane of the travel infrastructure the vehicle 12 is currently located. The controller 16 may then be configured to identify the location of each detected proximate object within the currently used travel infrastructure based on the relative position of each proximate object, as indicated in the proximity data and the map data 34. For example, if the detailed lane information included in the map data 34 or the proximity data indicates that a particular lane is located a given distance away from the current position of the vehicle 12, such information may be utilized to determine that the proximate vehicle is traveling in the given lane. Furthermore, if the proximity data indicates that a detected proximate object is located alongside the vehicle 12 at a distance from the vehicle 12 equal to the given distance, then the controller 16 may be configured to determine that the proximate vehicle is traveling in the given lane.

The braking system 42, steering system 44, and engine system 46 may control movement of the vehicle 12, such as at the direction of the controller 16. In particular, the controller 16 may be configured to plan an operation for each detected proximate object based on the determined operating state for each object. The controller 16 may then be configured to generate a driving plan for the vehicle 12 that avoids a collision with any of the detected proximate objects assuming they act according to the planned operations. Thereafter, the controller 16 may be configured to cause the vehicle 12 to operate according to the driving plan by transmitting corresponding control signals to the braking system 42, the steering system 44, and the engine system 46. For example, the controller 16 may transmit a control signal to the braking system 42 to slow down or stop the vehicle 12, may transmit a control signal to the steering system 44 to turn or adjust a heading of the vehicle 12, and may transmit a control signal to the engine system 46 to speed up the vehicle 12 to a specified velocity, to maintain a specified velocity, and to shift gears, in accordance with the driving plan.

The vehicle may include a reverse backup system that utilizes the braking system 42, steering system 44, engine system 46 to control movement of the vehicle 12 during vehicle reversal out of a parking area. For example, a vehicle may be parked in a garage and when a user places the vehicle in "REVERSE," the reverse backup system may be activated. The reverse backup system may also utilize the proximity sensors 38 to identify an object is proximate to the vehicle. When an object is identified by the proximity sensors 38 as being proximate to the vehicle (e.g., within five feet, two feet, one foot, or any distance), an audible warning may be output on vehicle speakers. In another embodiment, when an object is identified by the proximity sensors 38, vehicle seats may vibrate to warn a user that an object is near. In another embodiment, when an object is identified by the proximity sensors 38, a visual indication may be output on a display screen of the vehicle. For example, if an object is within a certain distance from the vehicle, a green indicator may be activated to warn the user than an object is near. As the vehicle and object become closer to each other, the indicator may turn yellow, and then red when very close to the vehicle (e.g., within one foot or less).

In one embodiment, the reverse backup system may be autonomous or semi-autonomous. For example, in a semi-autonomous mode, the system may maneuver the steering wheel utilizing the steering system 44, however, it may require the user to operate the brakes and gas pedal of the vehicle 12. In an autonomous mode, however, the reverse backup system may fully maneuver the vehicle 12 utilizing the braking system 42, steering system 44, and the engine system 46 to, for example, control reversal of the vehicle 12 in and out of a parking area.

The remote server 14 may (similar to the vehicle 12) include a processor, memory, and non-volatile storage including data and software that, upon execution by the processor of the remote server 14, causes the remote server 14 to perform the functions, features, and processes of the remote server 14 discussed herein. The remote server 14 may have access to one or more autonomous databases 48, which may be maintained in the non-volatile storage of the remote server 14 or in an external persistent storage device accessible by the remote server 14, such as a network drive. The autonomous databases 48 may include up-to-date versions of the data stored in the non-volatile storage 22 of the controller 16, such as the cost function data 26, map data 34, and so on. Periodically, the controller 16 may be configured to query the remote server 14 via the communications module 36 to determine if its data is up to date. If not, the remote server 14 may be configured to transmit the up-to-date data to the vehicle 12 for inclusion in the non-volatile storage 22. Alternatively, responsive to an update to the autonomous databases 48 that is relevant to the vehicle 12, the remote server 14 may be configured to transmit the updated data to the vehicle 12.

Figure 2:
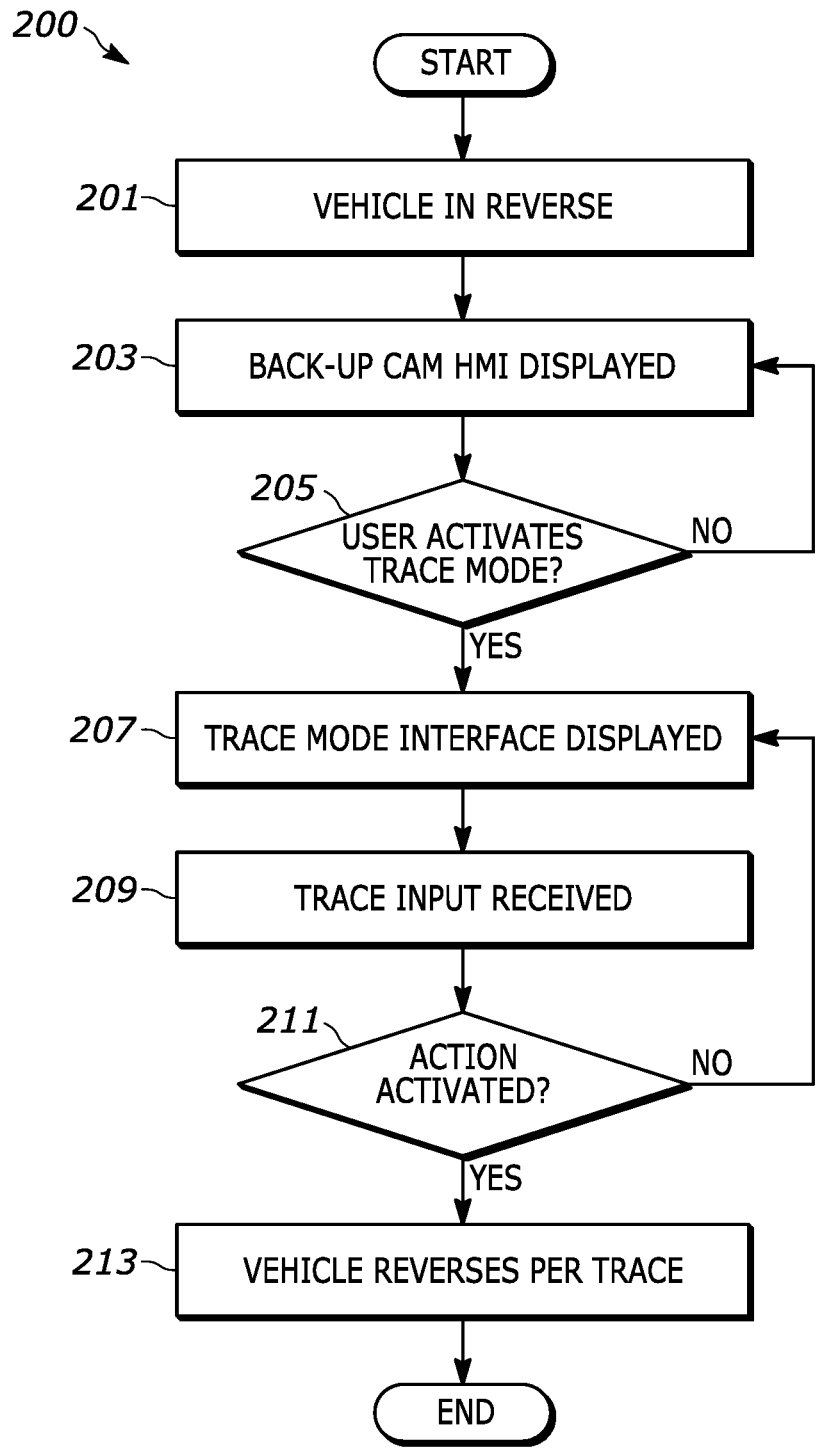
FIG. 2 illustrates a flowchart 200 for a trace mode feature that is activated in a vehicle's reverse backup system.

FIG. 2 illustrates a flowchart 200 for a trace mode feature that is activated in a vehicle's reverse backup system. At step 201, a vehicle that includes a reverse backup system that may begin to reverse out of a parking area. For example, a vehicle may be in a parking spot located in a garage, parking space, or other area that requires the vehicle to be driven in reverse mode to exit the area. The vehicle may be placed in a reverse mode in an automatic or manual transmission vehicle to allow the vehicle to operate in reverse and thus drive in a reverse path.

At step 203, the back-up camera user interface (e.g., HMI) may be displayed in the vehicle. The vehicle may display the back-up camera HMI on any display in the vehicle, such as a navigation display, multimedia display, heads-up display, instrument panel, rear view mirror display, etc. The back-up camera HMI may include images or video taken from a camera located on a rear bumper, trunk, or any other location in the vehicle to display a vehicle's surrounding in the rear area of the vehicle. In certain embodiments, the back-up camera HMI may display driving path lines that the vehicle will take based on steering wheel position. Furthermore, the back-up camera HMI may include different colors to indicate a distance to an object, driving path indicators that change as a position of a vehicle's steering wheel changes, etc.

At decision 205, the system may determine whether the user activated a trace mode option to reverse the vehicle. For example, rather than simply reversing the vehicle to exit a parking area (e.g., garage, parking spot, etc.), the back-up camera HMI may allow a user for semi-autonomous or autonomous options to drive the vehicle on a certain path (e.g., reverse path.) If the user does not elect to utilize the trace mode, or any other similar mode (e.g., voice mode, object avoidance mode, etc.). In another embodiment, the vehicle may simply just display the back-up camera HMI.

At step 207, the system determines that the user activated the trace mode option to reverse the vehicle. The trace mode interface may be displayed on a display screen of the vehicle. The trace mode interface may have various options or texts displayed to the user. For example, the trace mode interface may include text to describe operation of the trace mode feature. In such an example, the text may state that the user should trace a path for the vehicle to travel utilizing their finger. In the trace mode, the vehicle's camera may display a bitmap image of the reverse area proximate the vehicle. The bitmap image may be editable to include drawings, overlay, or other renderings from the user's input.

For example, the bitmap image may allow the user to trace a path for the vehicle to reverse out of a parking area. In alternative embodiments, other image files may be utilized such as JPEG, PNG, TIFF, GIF, PNG, EPS, etc.

At step 209, the trace input may be received from the touch display of the vehicle. Upon the release of the finger against the touch panel, the system may be presented with options to begin various commands. For example, the vehicle may include options such as "Start Back Up," "Cancel," "Clear Path/Start Over," or "Edit the Path." Thus, the user may have options to clear the traced path, cancel the trace mode, edit the path by adding additional trace lines, begin to reverse according to the path, etc.

At step 211, the system may determine whether an action is activated to begin driving the vehicle along the traced path. If the action has not been activated, the system may simply display the trace mode interface and continue to collect user input based on the trace provided. In one example, the trace mode interface may require the user to press an activation button to begin reversing the vehicle. In another example, the system may assume that the trace path is fully traced upon the user lifting its finger off the touch panel or display.

At step 213, if the action to begin driving the vehicle has been activated, the system may reverse the vehicle according to the trace. For example, the touch panel may collect trace data that is overlaid on the bitmap image of the rear area of the vehicle. The trace data may be fed into the Advanced Driving Assistance System (ADAS) system to correlate the trace data with a proposed driving path. For example, each trace point of the trace data may be associated with a driving path point that the vehicle will take when the reverse action is initiated. The system may estimate where each trace point is in the real world by utilizing the various vehicle sensors (e.g., radars, cameras, etc.).

Figure 3:
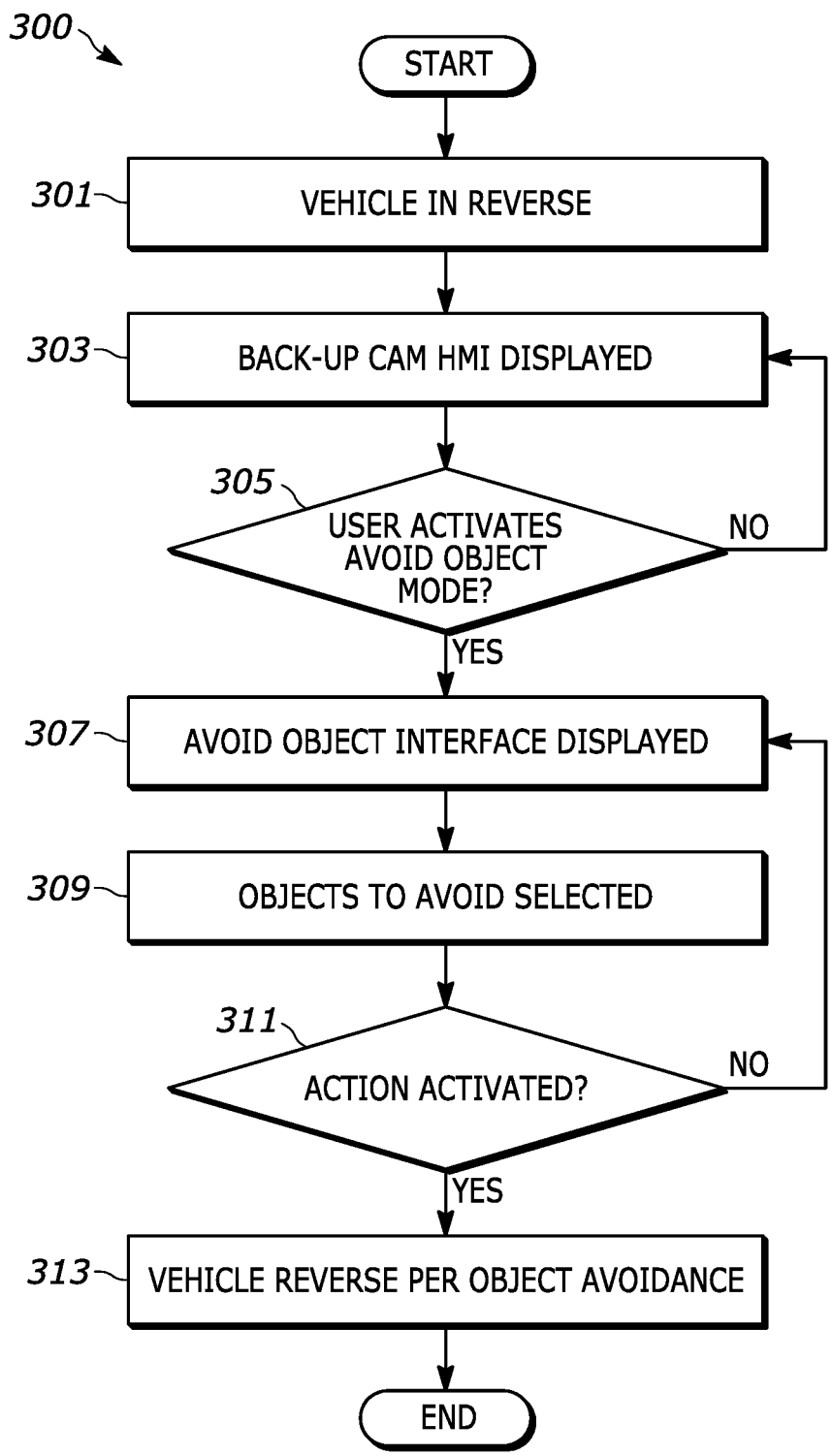
FIG. 3 illustrates a flowchart 300 for an object avoidance mode feature that is activated in a vehicle's reverse backup system.

FIG. 3 illustrates a flowchart 300 for an object avoidance mode feature that is activated in a vehicle's reverse backup system. At step 301, a vehicle that includes a reverse backup system may begin to reverse out of a parking area. For example, a vehicle may be in a parking spot located in a garage, parking space, or other area that requires the vehicle to be driven in reverse mode to exit the area. The vehicle may be placed in a reverse mode in an automatic or manual transmission so that the vehicle is driven in a reverse path.

At step 303, the back-up camera HMI may be displayed in the vehicle. The vehicle may display the back-up camera HMI on any display in the vehicle, such as a navigation display, multimedia display, heads-up display, instrument panel, rear view mirror display, etc. The back-up camera HMI may include images or video taken from a camera located on a rear bumper, trunk, or any other location in the vehicle to display a vehicle's surrounding in the rear area of the vehicle. In certain embodiments, the back-up camera HMI may display driving path lines that the vehicle will take based on steering wheel position. Furthermore, the back-up camera HMI may include different colors to indicate a distance to an object, driving path indicators that change as a position of a vehicle's steering wheel changes, etc.

At decision 305, the system may determine whether the avoid object mode is activated. The avoid object mode interface may have various options or texts displayed to the user. For example, the avoid object mode interface may include text to describe operation of the avoid object mode feature. In such an example, the text may state that the user should select or tap on various objects to avoid to allow the vehicle to create a path for the vehicle to travel in reverse. In the avoid object mode, the vehicle's camera may display a bitmap image of the reverse area proximate the vehicle. The bitmap image may be editable to include drawings, overlay, or other renderings from the user's input. For example, the bitmap image may allow the user to select or tap on various objects or boundaries to define areas to avoid for a vehicle's reverse path.

At step 307, the system determines that the user activated the "avoid object" mode option to reverse the vehicle. The "avoid object" mode interface may be displayed on a display screen of the vehicle. The avoid object mode interface may have various options or texts displayed to the user. For example, the avoid object mode interface may include text to describe operation selecting certain objects or to circle certain objects to avoid. In such an example, the text may state that the user should circle objects for the vehicle to avoid utilizing their finger. In the "avoid object" mode, the vehicle's camera may display real-time video or imagery of the reverse area proximate the vehicle.

At step 309, the input may be received from the touch display of the vehicle to identify the objects to avoid. For example, a user may utilize their finger and encircle an object displayed on the touch screen. Upon the release of the finger against the touch panel, the system may be presented with options to begin various commands. For example, the vehicle may include options such as "Start Back Up," "Cancel," "Clear Objects/Start Over," or "Edit the Object." Thus, the user may have options to clear the object selection, cancel the avoid object mode, begin to reverse according to the path, etc.

At step 311, the system may determine whether an action is activated to begin operation of the vehicle to avoid the selected objects. If the action has not been activated, the system may simply display the object avoidance mode interface and continue to collect user input. In one example, the object avoidance mode interface may require the user to press an activation button to begin reversing the vehicle. In another example, the system may activate reversal of the vehicle in the object avoidance mode when the system determines that a path can be predicted when enough objects are selected to avoid.

At step 313, if the action is activated to begin operation of the vehicle to avoid the selected objects, the system may reverse the vehicle avoiding the selected objects. For example, the touch panel may collect the selected objects to avoid. Such representations of the objects may be overlaid on the bitmap image of the rear area of the vehicle. The system may then determine a path to take to reverse the vehicle while avoiding the selected objects. Such information may be fed into the ADAS system to correlate the selected objects with a proposed reversal path. For example, the ADAS system may identify a start point and end point for the vehicle, and segment the path from the start point and end point into multiple segments. Based upon each identified segment, the vehicle may drive to avoid each object in that respective segment. The system may estimate where each selected object to avoid is located in the real world by utilizing the various vehicle sensors (e.g., radars, cameras, GPS, etc.).

Figure 4:
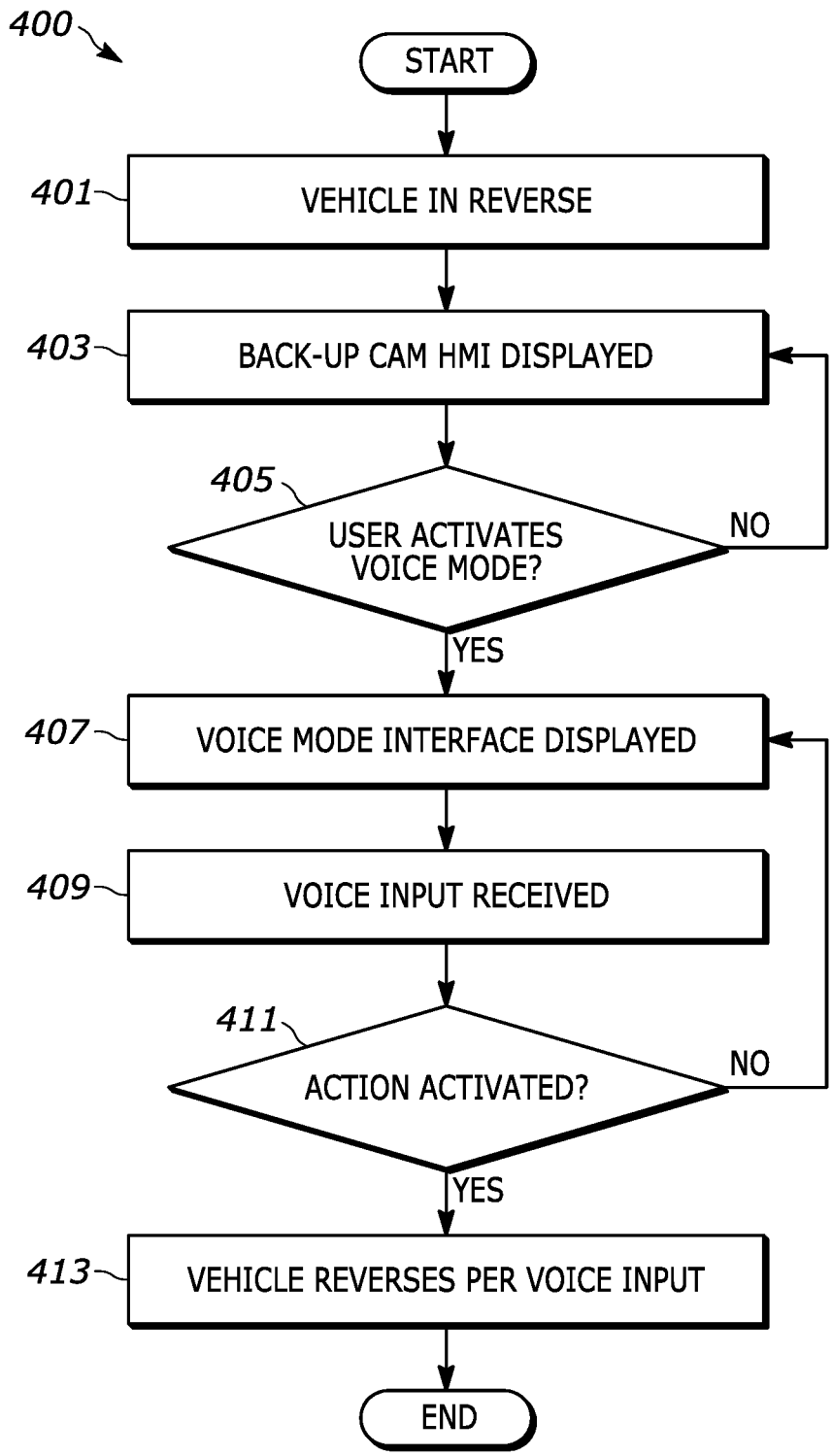
FIG. 4 illustrates a flowchart 400 for a voice mode feature that is activated in a vehicle's reverse backup system.

FIG. 4 illustrates a flowchart 400 for a voice mode feature that is activated in a vehicle's reverse backup system. At step 401, a vehicle that includes a reverse backup system may begin to reverse out of a parking area. For example, a vehicle may be in a parking spot located in a garage, parking space, or other area that requires the vehicle to be driven in reverse mode to exit the area. The vehicle may be placed in a reverse mode in an automatic or manual transmission so that the vehicle is driven in a reverse path.

At step 403, the back-up camera HMI may be displayed in the vehicle. The vehicle may display the back-up camera HMI on any display in the vehicle, such as a navigation display, multimedia display, heads-up display, instrument panel, rear view mirror display, etc. The back-up camera HMI may include images or video taken from a camera located on a rear bumper, trunk, or any other location in the vehicle to display a vehicle's surrounding in the rear area of the vehicle. In certain embodiments, the back-up camera HMI may display driving path lines that the vehicle will take based on steering wheel position. Furthermore, the back-up camera HMI may include different colors to indicate a distance to an object, driving path indicators that change as a position of a vehicle's steering wheel changes, etc.

At decision 405, the system may determine whether the user activates the voice mode feature. The system may determine whether the user activated the voice mode feature utilizing a number of inputs on various vehicle interfaces, such as the touch screen, voice recognition system, etc. If the user did not activate the voice mode feature, the system may simply continue displaying the back-up camera HMI.

At step 407, if the user activated the voice mode, the system may begin to execute commands to activate the voice mode interface. The voice mode interface may be displayed or outputted. The voice mode interface may be displayed on a display screen of the vehicle, such as an instrument panel, heads-up display, navigation display, multimedia display, etc. In other embodiments, the voice mode interface may not require any utilization of a display, but may simply utilize a voice command session to operate the voice mode. For example, a voice recognition session may be activated that allows the vehicle to provide feedback to users (e.g., output voice commands to speakers, or output on a display, etc.).

At step 409, the voice command may be received at the microphone and then sent to the controller (e.g., processor) for processing. In one example, when a voice session is activated in the voice mode of the reversal, the system may request certain commands to be spoken by the user. For example, a voice command may indicate for the vehicle to "go straight back," "turn the wheel right," "turn the wheel left," "stop," "end," etc. The system may process the voice command and then determine the appropriate request to send to the associated vehicle system (e.g., braking system, steering system, engine system, etc.).

At step 411, the system may determine whether an action is activated to begin operation of the vehicle to reverse per the voice command. If the action has not been activated, the system may simply display the voice mode interface and continue to collect user input via voice commands. In one example, the voice mode interface may require the user to press an activation button to begin reversing the vehicle. In another example, the system may activate reversal of the vehicle in response to voice commands spoken by a user.

At step 413, if the action is activated to begin operation of the vehicle to reverse per the voice command, the system may reverse the vehicle according to the voice commands. For example, the system may receive voice commands that are input from a user. Such voice commands may be representations of how the vehicle should maneuver in a reversal situation. The system may then determine a path to take to reverse the vehicle based on the voice commands. Such information may be fed into the ADAS system to correlate a reversal path. For example, the ADAS system may identify a start point and end point for the vehicle and divide the path from the start point and end point into multiple segments. Based upon each identified segment, the vehicle may drive to avoid each object in that respective segment based on voice commands for each respective segment. In various implementations, the voice commands may be provided in real-time by the user to direct the vehicle to maneuver around paths. For example, the voice commands provided by the user may include "Turn Right", "Turn Left," "Continue in Reverse," "Stop," and "End Process" as the vehicle is in motion.

Figure 5:
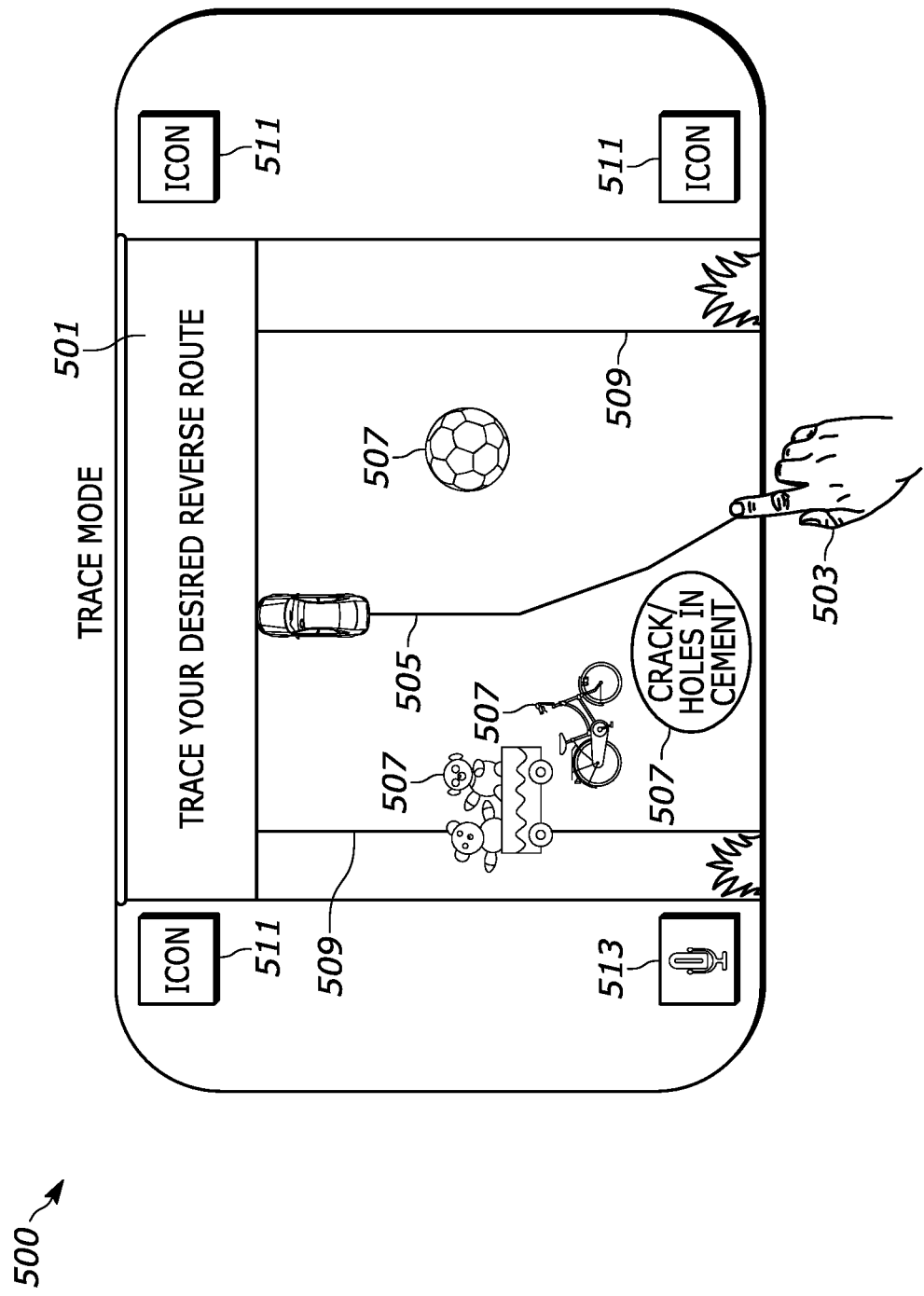
FIG. 5 illustrates an example user interface 500 of the trace mode feature.

FIG. 5 illustrates an example user interface 500 of the trace mode feature. The trace mode interface may include a notification area 501. The notification area 501 may display notifications and other messages to be displayed to the user. For example, the notification area 501 may display a notification of how the user can operate, such as stating "Trace your desired reverse route." Other notifications may include "Lift your finger off the touch screen to begin the route tracing." The notifications displayed in the notification area 501 may also be outputted on vehicle speakers utilizing text to speech or pre-recorded audio.

The trace mode interface may include imagery of an overview of an area proximate the vehicle. The area may include a rear area or a bird's eye aerial view that may be taken from multiple cameras or a 360-degree camera that the vehicle is equipped with. On the trace mode interface, the user may utilize one or more fingers 503 to activate or deactivate various functions or to trace a path. In an alternative embodiment, rather than utilizing a touch screen interface, a display may be utilized in conjunction with a haptic device, mouse, or other user input to trace a path or activate icons 511. As shown, one or more fingers 503 may be dragged across the touch panel screen to create a driving path 505. The driving path 505 that is created by the user may then be the path taken by the vehicle upon activation. The screen may display various obstacles that the vehicle should avoid as well. The various sensors (e.g., cameras, radars, etc.) may be able to identify various objects 507 to avoid, as well as curb boundaries 509. Thus, the identification of the curb boundaries 509 and objects 507 may help a user identify an optimal driving path 505 to trace.

The trace mode interface may also include various icons 511 to activate or deactivate features. The various icons 511 may relate to editing the driving path that is created. For example, the icons 511 may be a "Clear" or "Undo" button to completely restart the path or to undo a last trace. The trace mode interface may also include a microphone input button 513. The microphone input button 513 may be utilized to activate the voice mode feature. The icons 511 may include various audio commands, climate control commands, or other commands.

Figure 6:
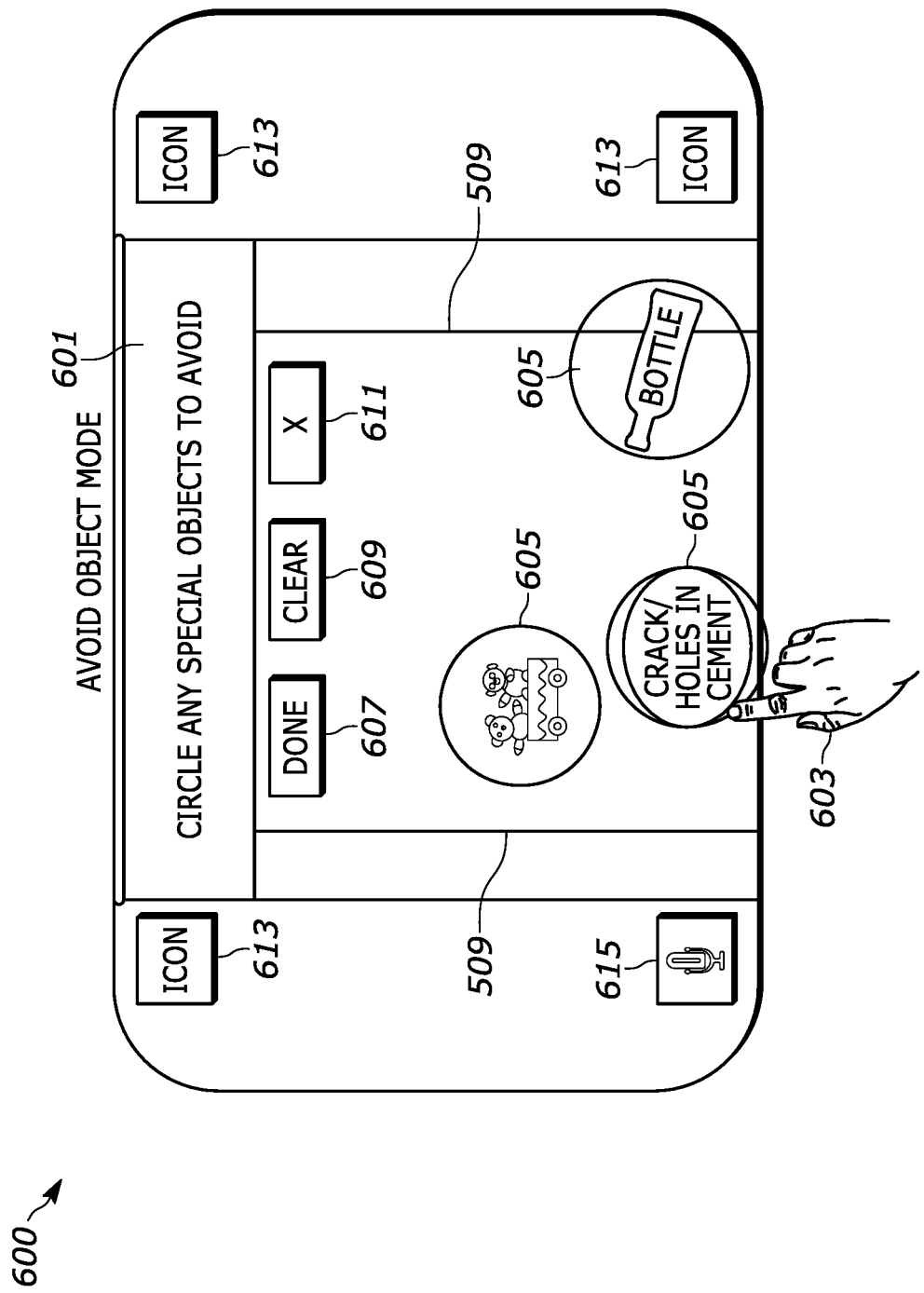
FIG. 6 illustrates an example user interface 600 of the object avoidance mode feature.

FIG. 6 illustrates an example user interface 600 of the object avoidance mode feature. The object avoidance mode interface may include a notification area 601. The notification area 601 may display notifications and other messages to be displayed to the user. For example, the notification area 601 may display a notification of how the user can operate, such as stating "Circle any special objects to avoid." Other notifications may include "Tap on an object to avoid that object." The notifications displayed in the notification area 601 may also be outputted on vehicle speakers utilizing text to speech or pre-recorded audio.

The object avoidance mode interface may include imagery of an overview of an area proximate the vehicle. The area may include a rear area or a bird's eye aerial view that may be taken from multiple cameras or a 360-degree camera that the vehicle is equipped with. On the object avoidance mode interface, the user may utilize one or more fingers 603 to identify objects to avoid. Upon selection of those objects, an automated driving path may be created that avoids those objects. Such objects 605 may be identified on the user interface 600. In an alternative embodiment, rather than utilizing a touch screen interface, a display may be utilized in conjunction with a haptic device, mouse, or other user input selected objects 605 to avoid. As shown, one or more fingers 603 may be used to circle or select an object on the touch panel screen to create an object 605 to avoid. Such objects 605 may be objects not readily identifiable by a backup sensor given the location of those objects. For example, the objects may be too low for the backup sensor to identify. The various sensors (e.g., cameras, radars, etc.) may be able to identify various objects 605 to avoid, as well as curb boundaries 509. Thus, the identification of the curb boundaries 509 and objects 605 may help create an automated path for the vehicle to take.

The object avoidance mode interface may also include various touch buttons to help facilitate the object avoidance selection. For example, the object avoidance mode interface may include a "DONE" button 607 that the user may select upon selecting all of the objects to avoid. Upon pressing the "DONE" button 607, the vehicle may begin to populate an automated drive path and then begin reversing the vehicle to avoid the selected objects. The screen may also include a "CLEAR" button 609. The "CLEAR" button 609 may clear all selections of objects that are selected, which in turn may allow a user to select new objects. In another example, the system may include a "CANCEL" button 611 that may be displayed by an "X" or similar icon. The "CANCEL" button 611 may be utilized to cancel out of the object avoidance screen. In one example, the "CANCEL" button 611 may bring the user to another user interface.

The object avoidance mode interface may also include various icons 613 to activate or deactivate features. The trace mode interface may also include a microphone input button 615. The microphone input button 615 may be utilized to activate the voice mode feature. The icons 613 may be various audio commands, climate control commands, or other commands.

Figure 7:
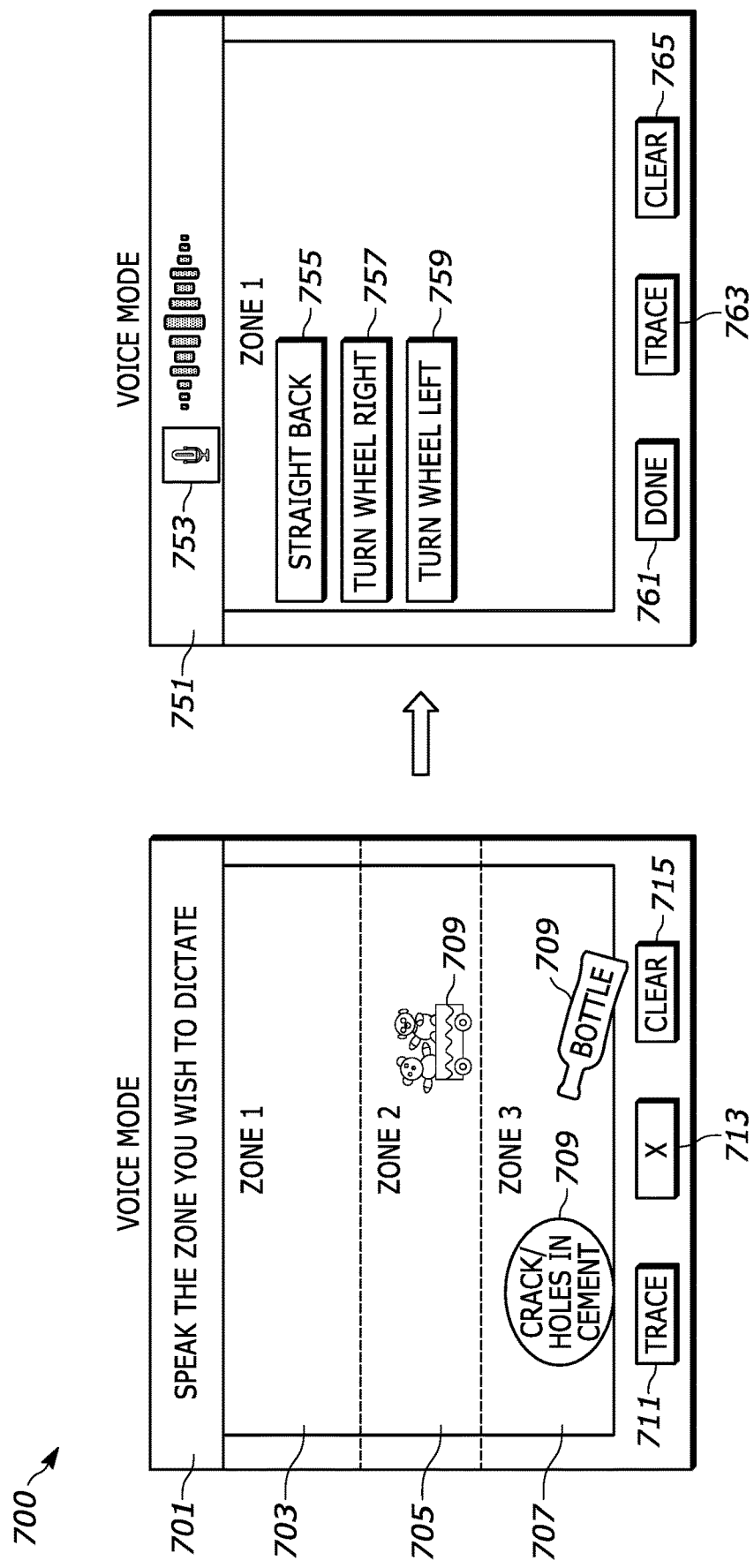
FIG. 7 illustrates an example user interface 700 of the voice mode feature.

FIG. 7 illustrates an example user interface 700 of the voice mode feature. FIG. 7 shows a first screen 701 and a second screen 751 that are associated with the voice mode feature. The first screen may include an indication of various segments that could be utilized in the reverse mode to allow a user to speak the commands at those various segments. In one example, the path requires three segments, a first segment 703 (e.g., Zone 1), a second segment 705 (e.g., Zone 2), and a third segment 707 (e.g., Zone 3). Furthermore, the display screen may show objects 709 that may be in a path of the vehicle. The first screen 701 of the voice mode may include a trace button 711 that allows the user to manually trace a path or select objects, a cancel button 713 that allows the user to exit the screen, and a clear button 715 that allows the user to clear any selections made. The first screen 701 may also include a message bar at the top to convey any messages to the user.

The system may request voice commands for the user to input at each zone. For example, the second screen 751 may be an example of a voice input screen for the first segment 703 (e.g., Zone 1). The second screen 751 may show that the vehicle is in Zone 1 on the screen. The second screen 751 may also include an input button that allows the user to manually activate a voice session. The second screen 751 may also display various voice commands that may be spoken into the system to allow the user to command the vehicle to reverse in a specific path. For example, a voice command may indicate for the vehicle to go straight back 755, turn the wheel right 757, or turn the wheel left 759. The second screen 751 of the voice mode may include a "DONE" button 761 that allows the user to manually finish the voice mode for the given segment or zone, a "TRACE" button 763 that allows the user to manually trace a path or select objects, and a "CLEAR" button 765 that allows the user to clear any selections made. The second screen 751 may also include a message bar at the top to convey any messages to the user. Furthermore, the second screen 751 may include a voice button 753 that allows the user to either repeat voice commands output on the speaker from the system or to activate a voice command session (e.g., as an alternative to voice recognition button on the steering wheel switch). Upon finishing the reversing in the zone, the system may display additional screens associated with the other zones.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system comprising:
a camera configured to output imagery of a surrounding of a vehicle;
a touch panel screen configured to display the imagery and receive one or more inputs from a finger of a user when the imagery is displayed on the touch panel screen; and
a processor in communication with the camera and the touch panel screen, wherein the processor is programmed to:
associate a path for the vehicle to drive in response to the one or more inputs from the finger tracing the path for the vehicle to drive;
identify an object to avoid in the path in response to one or more inputs from the user including a first touch from a finger of a user on the screen and an ending of the first touch of the finger off the screen encircling the object to avoid, wherein the path circumvents the object to avoid in response to the finger encircling the object to avoid; and
execute one or more driving commands to operate the vehicle along the path in reverse.

2. The vehicle system of claim 1, wherein the one or more driving commands includes a steering command to steer the vehicle along the path in reverse.

3. The vehicle system of claim 1, wherein the one or more driving commands includes a braking command to brake the vehicle at one or more points along the path in reverse.

4. The vehicle system of claim 1, wherein the one or more driving commands includes fully operating the vehicle along the path in reverse.

5. The vehicle system of claim 1, wherein the imagery includes a video feed of the vehicle surrounding.

6. The vehicle system of claim 1, wherein the surrounding includes a rear area proximate a rear end of the vehicle.

7. A vehicle system comprising:
   a camera configured to output imagery of a surrounding of a vehicle;
   a screen configured to display the imagery and receive one or more inputs from a user when the imagery is displayed on the screen; and
   a processor in communication with the camera and the screen, wherein the processor is programmed to:
   identify an object to avoid in response to one or more inputs from the user in response to a first touch from a finger of a user on the screen and an ending of the first touch of the finger off the screen identifying the object to avoid;
   determine a path for the vehicle to drive in response to the one or more inputs from the user wherein the path circumvents the object to avoid in response to the finger encircling the object to avoid; and
   execute one or more driving commands to operate the vehicle along the path in reverse.

8. The vehicle system of claim 7, wherein the processor is further programmed to associate the object to avoid in response to a first touch from a finger of a user on the screen and an ending of the first touch of the finger off the screen.

9. The vehicle system of claim 7, wherein the one or more driving commands includes a steering command to steer the vehicle along the path in reverse.

10. The vehicle system of claim 7, wherein the one or more driving commands
    includes a braking command to brake the vehicle at one or more points along the path in reverse.

11. The vehicle system of claim 7, wherein the one or more driving commands includes fully operating the vehicle along the path in reverse.

12. The vehicle system of claim 7, wherein the imagery includes a bitmap image converted from a video feed of the surrounding.

* * * * *